United States Patent [19]

Willis et al.

[11] Patent Number: 5,999,734
[45] Date of Patent: Dec. 7, 1999

[54] COMPILER-ORIENTED APPARATUS FOR PARALLEL COMPILATION, SIMULATION AND EXECUTION OF COMPUTER PROGRAMS AND HARDWARE MODELS

[75] Inventors: John Christopher Willis; Robert Neill Newshutz, both of Rochester, Minn.

[73] Assignee: FTL Systems, Inc., Rochester, Minn.

[21] Appl. No.: 08/954,843

[22] Filed: Oct. 21, 1997

[51] Int. Cl.$^6$ .................................................. G06F 9/45
[52] U.S. Cl. ...................... 395/706; 395/701; 395/705; 712/1; 712/15; 712/28; 709/200; 709/201
[58] Field of Search .................. 395/800.01, 800.15, 395/800.28, 800.09, 800.37, 200.31, 701, 705, 706; 709/200, 201; 712/1, 9, 15, 28, 37

[56] References Cited

U.S. PATENT DOCUMENTS

| | | | |
|---|---|---|---|
| 5,088,034 | 2/1992 | Ihara et al. | 395/706 |
| 5,111,413 | 5/1992 | Lazansky et al. | 364/578 |
| 5,339,429 | 8/1994 | Tanaka et al. | 712/205 |
| 5,361,373 | 11/1994 | Gilson | 395/800.01 |
| 5,418,953 | 5/1995 | Hunt et al. | 709/3 |
| 5,506,999 | 4/1996 | Skillman et al. | 709/6 |
| 5,784,636 | 7/1998 | Rupp | 395/800.37 |
| 5,841,967 | 11/1998 | Sample et al. | 395/183.09 |

OTHER PUBLICATIONS

J. Auslander et al., "Fast, Effective Dynamic Compilation", appears in Proceedings of PLDI '96, pp. 149–159, Pennsylvania, May 1996.

J–L. Baer et al., "Model, Design, and Evaluation of a Compiler for a Parallel Processing Environment", IEEE Transactions on Software Engineeing, vol. SE–3, No. 6, Nov. 1977.

Bernstein et al., "Distributed Compilation of VHDL", Vantage Analysis Systems, Inc., Spring 1992 VHDL International User's Group Meeting, May, 1992.

R. Chandra et al., "Data Distribution Support on Distributed Shared Memory Multiprocessors", appears in Proceeding of PLDI '97, pp. 334–345, Las Vegas, Nevada.

D. Engler, "VCODE: A Retargetable, Extensible, Very Fast Dynamic Code Generation System", appears in Proceeding of PLDI '96, pp. 160–170, Pennsylvania, May 1996.

K. Hering et al., "Hierarchical Strategy of Model partitioning for VLSI–Design Using an Improved Mixture of Experts Approach", 10$^{th}$ Workshop on Parallel and Distributed Simulation, (PADS '96), May 1996.

D. Skillicorn et al., "Parallel Compilation: A Status Report", External Technical Report, Queen's University, March 1990.

J. Willis, "Auriga: A Compiler that Addresses NUMA Architectures", WESCON/96 IC EXPO Applications Conference on Communications and Computer Technologies, Anaheim, CA, 1996.

J. willis et al., "MinSim: Optimized, Compiled VHDL Simulation Using Networked & Parallel Computers", appears in Proceedings of Fall 1993 VHDL International User's Forum.

J. Willis et al., "Optimizing VHDL Compilation for Parallel Simulation", IEEE Design & Test of Computers, Sep. 1992, pp. 42–53.

J. Willis, "Optimizing VHDL Compilation for Parallel Simulation", Carnegie Mellon University Dissertation, Pittsburgh, Pennsylvania, 1991.

*Primary Examiner*—Meng-Ai T. An
*Assistant Examiner*—Nabil El-Hady
*Attorney, Agent, or Firm*—Craig J. Lervick

[57] ABSTRACT

A distributed, compiler-oriented database is disclosed with operating modes including parallel compilation, parallel simulation and parallel execution of computer programs and hardware models. The invention utilizes a hardware apparatus consisting of shared memory multiprocessors, optionally augmented by processors with re-configurable logic execution pipelines or independently scheduled re-configurable logic blocks and a software database apparatus, manifest in the hardware apparatus, in order to efficiently support parallel database clients such as a source code analyzer, an elaborator, an optimizer, mapping and scheduling, code generation, linking/loading, execution/ simulation, debugging, profiling, user interface and a file interface.

44 Claims, 10 Drawing Sheets

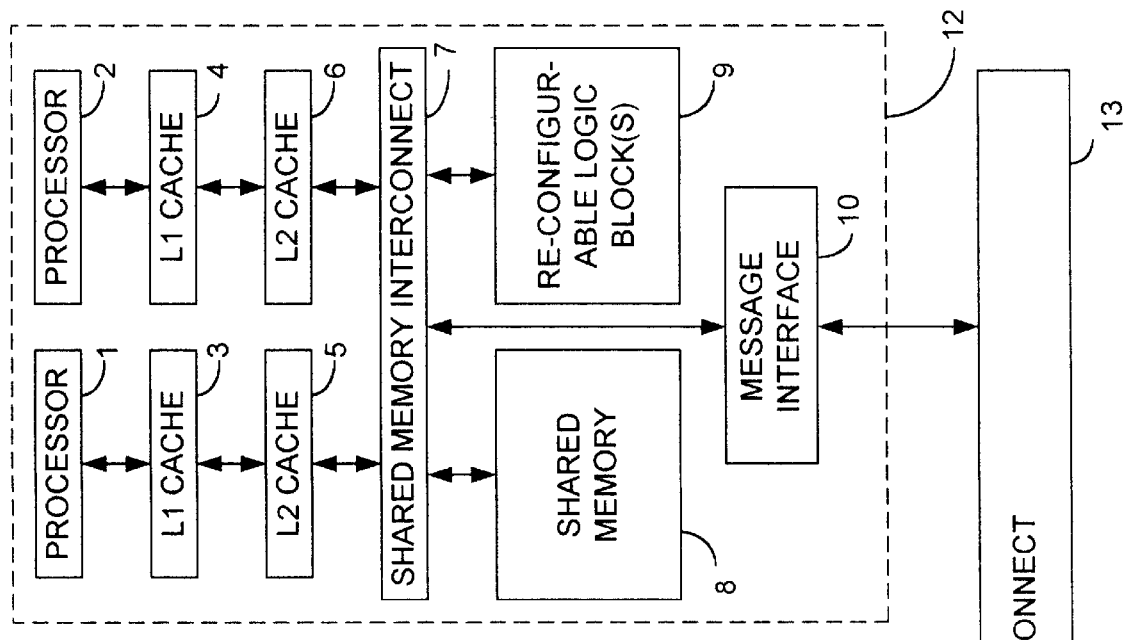
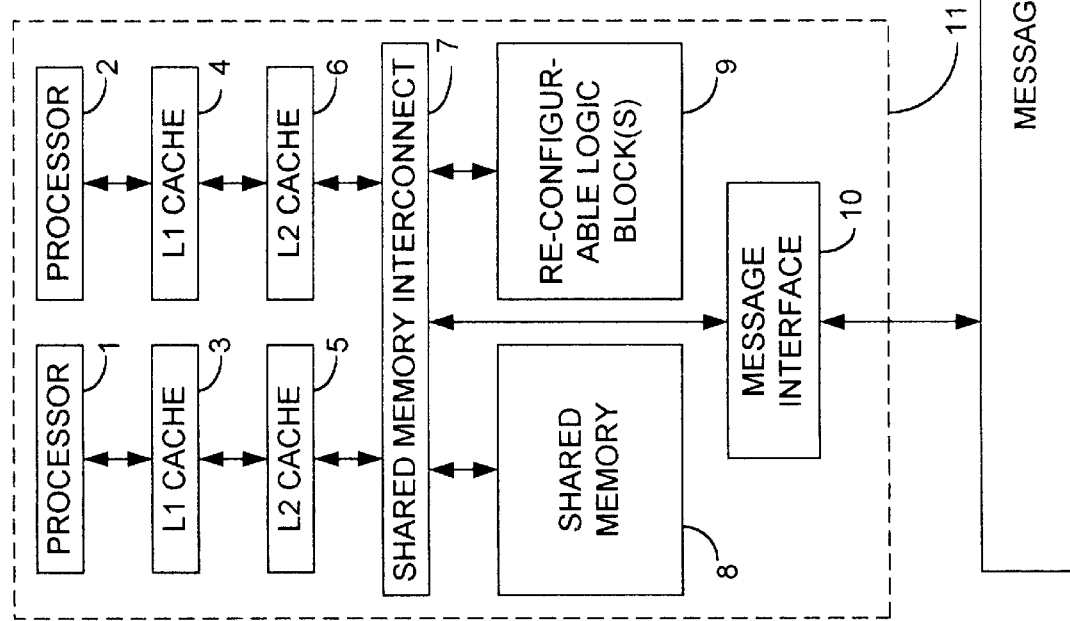
FIG. 1

COMPILER-ORIENTED APPARATUS FOR PARALLEL COMPILATION, SIMULATION AND EXECUTION OF COMPUTER PROGRAMS AND HARDWARE MODELS

BACKGROUND OF THE INVENTION

Distributing the compilation, simulation and execution of computer programs and hardware models among two or more processing nodes has two primary advantages: increased program/model capacity and decreased simulation/execution time. The size and complexity of program/model which can be compiled and simulated/executed increases due to the additional memory as well as processing resources available. Simulation/execution time decreases due to the opportunity for accesses for optimization to the partially compiled intermediate representing the program/model as well as concurrent compilation, simulation and execution by multiple processing nodes.

A processing node consist of one or more general-purpose processors sharing a common memory. Optional components of a processing node include processor-specific memory, various levels of memory caching specific to a single processor or shared among two or more processors, and re-configurable logic specific to a single processor or common to two or more processors. Processing nodes may support one or more distinct virtual address spaces mapped onto physical memory devices through conventional address translation hardware and software. Processing nodes may be considered as shared memory multiprocessors to which re-configurable logic arrays have been added.

Processing nodes (and shared memory multiprocessors) are readily constructed in configurations containing up to approximately a dozen processors, however as additional processors are added with connection to a common shared memory, the efficiency of each processor degrades due to contention for the common shared memory. Therefore larger and more powerful computing systems are often created by connecting two or more such processing nodes using point-to-point or multi-cast message protocols. Point-to-point message protocols communicate a unit of information (message) from an agent on one processing node to an agent on the same processing node or another processing node. Multi-cast message protocols communicate from an agent on one processing node to one or more agents on the same or other processing nodes. Agent functionality is embodied either as software running on processors or hardware embedded in or associated with re-configurable logic arrays. Such agents embody components of compilation, simulation or execution.

Compilation, simulation and execution are productively viewed as tightly inter-related modes of operation embodied in processor executables (manifest in caches and memory) and logic configuration (manifest in re-configurable logic elements). Compilation translates one or more computer programs and/or hardware models into processor executables and logic configuration information. The behavior represented by the executables and logic configuration may then be evaluated as simulation and/or execution. In general use, simulation often refers to the evaluation of hardware models whereas execution often refers to the evaluate of a computer program. With the increasing use of hardware description languages (such as VHDL and Verilog) as well as hardware/software co-design, simulation and execution have become almost indistinguishable operating modes and are treated as such in the following.

In order to accommodate incremental modes of operation on programs and models, such as symbolic debug, profiling, fault insertion, selective event tracing, dynamic linking of libraries, incremental optimization of executables (based on available resources or new information) and programming interfaces, which call for the incremental modification of the program/model under execution/simulation, it is useful for the compilation and execution/simulation modes to be tightly coupled. Such tight coupling reduces simulation/execution time given fixed execution resources.

Compilation is typically arranged in a unidirectional pipeline using two or more intermediate files (actual or simulated in memory via pipes) before reaching the execution/simulation operating mode. Common intermediate files include intermediate optimization representations, textual assembly code, re-locatable binaries and executable files. Many simulators even introduce a programming language intermediate when compilation of a hardware model translates into a program which is then compiled by a programming-language specific compiler. Some optimizing compilers utilize as many as a dozen file intermediates.

Using apparatus such as files to communicate uni-directionally between phases of the compilation inhibits the rapid and efficient flow of information backward from later stages to earlier stages of the compilation operating mode. For example, back-end compiler functionality positioning executable processor instructions in shared memory or logic functionality within reconfigurable logic arrays can detect false-sharing or re-configurable logic pin contention which is most efficiently addressed by partial re-execution of earlier compilation functionality (mapping and scheduling in this case) to produce a more optimal simulation/execution load.

Files are also a very coarse communication mechanism between stages of compilation. Substantial information is generally present in a file intermediate which is irrelevant to a localized change to the simulation. Thus compilation or recompilation must handle substantial more information than is required for the desired operation. Such additional work consumes time, lengthening the time required to reach the execution/simulation stage.

In the few cases from the research literature when the compilation operating mode retains the entire intermediate in memory, rather than in a sequence of intermediate files, it has been in the memory of a single processor. Whereas global access to the entire intermediate throughout compiler operation has demonstrated substantial execution/simulation performance gains, any single processor generally has limited range of addressable as well as physically present memory. Thus such approaches limit the ease with which new agents may be introduced to alter compiler operation or target new simulation/execution apparatus and the size program or model which may be compiled on a single processor.

Within the existing compiler literature and production compiler environment, either compilation is run in parallel using shared memory multiprocessors to accelerate a single phase of compilation or source files are independently compiled into an associated executable followed by a sequential linkage of binaries into a single executable. Compilation via acceleration of a single compilation phase on a shared memory multiprocessor is well suited for research purposes, but is not directly applicable to decreasing the entire compilation or incremental recompilation delay. Compilation of each file comprising a multi-file program or model in isolation does not allow for the flow of information between files to yield a more optimal executable. For example, the body of a function present in one file is not available for incorporation at the call site in another file (often known as in-lining) unless the body is textually included as part of the second file's compilation. As more information is textually included into a single file, the file size increases, eventually limiting the total program or model size which can be compiled the total amount of work required for compilation (since the same information is analyzed more than once during compilation).

In 1990, the research was published describing the representation of an analyzed hardware description language model using intermediate representation instances of abstract data types (classes). Memory addresses (pointers) describe the relationship between instances. For example, a sequence of intermediate representation instances may each have a pointer to the next, forming a linked list. This work did not address the partitioning of an intermediate representation across more than one node (virtual address space), nor did it integrate more than the representation of the compiler's analysis phase.

In 1991, further research was published research exploring the feasibility of compiling, simulating and executing hardware models using shared memory or message-based parallel processors with a parallel intermediate representation. This publication suggested the distribution of an intermediate compiler representation by replacing each pointer in the intermediate representation of the analyzed form with a tuple (record) consisting of a field denoting the node and a field denoting the intermediate representation address on the specified node. This work also explored the complexities and possible approaches for incremental compilation.

A 1993 publication reported on an evolution of the 1991 work in a description of a distributed, post-analysis intermediate representation without further implementation detail and a post-elaboration and post-optimization (in-lining) redistribution of processes within the intermediate compilation. This work did not discuss a single, compiler-oriented database spanning multiple compilation phases, simulation or execution and did not discuss the parallel database representation.

In summary, an apparatus with compiler and simulation/execution operating modes is desirable which efficiently provides global access to specific information required for compilation as well as simulation/execution among the processors, memory and optional re-configurable logic of one or more processing nodes as such nodes become available for use. Such an apparatus and operating modes would provide for compilation and simulation/execution of larger designs than can be accommodated by compilation on a single node while providing opportunities for global optimization and incremental recompilation which reduce the time required to compile as well as simulate/execute.

Further work in October of 1996 disclosed a distributed, compiler-oriented database with clients including:

source analyzers (compiler component)
elaborator (compiler component)
optimizer (compiler component)
code generator (compiler component)
assembler (compiler component)
linker (compiler component)
runtime system (simulation/execution component)
debugger (simulation/execution component)
profilers (simulation/execution component)
event log (simulation/execution component) and
graphical tools (components of various phases).

The work introduced the concept of a single, compiler-oriented database spanning compilation and simulation/execution on a computer with multiple nodes.

SUMMARY OF THE INVENTION

This invention discloses an compiler-oriented database and client apparatus providing for efficient and tightly integrated operating modes including compilation, simulation and execution of computer programs and hardware models. The invention utilizes one or more nodes of a parallel computer system where each node is a single processor or shared memory multiprocessor optionally augmented by re-configurable logic devices. Benefits of the invention include the ability to compile designs many times larger than a single node could accommodate while providing global access to intermediate information associated with the compilation or simulation/execution operation. This global access significantly decreases the time required to (re)compile and simulate/execute a computer program and/or hardware model.

SUMMARY OF DRAWINGS

FIG. 1 illustrates an example of the underlying hardware apparatus, including two shared memory multiprocessor nodes with optional re-configurable logic blocks.

DESCRIPTION OF THE PREFERRED EMBODIMENT

This section will describe the best embodiment of the invention currently known to the inventor, however those skilled in the art will realize that there are many related implementations which practice the same invention, perhaps by substituting alternative means for accomplishing the functionality of a component.

Figure 2:
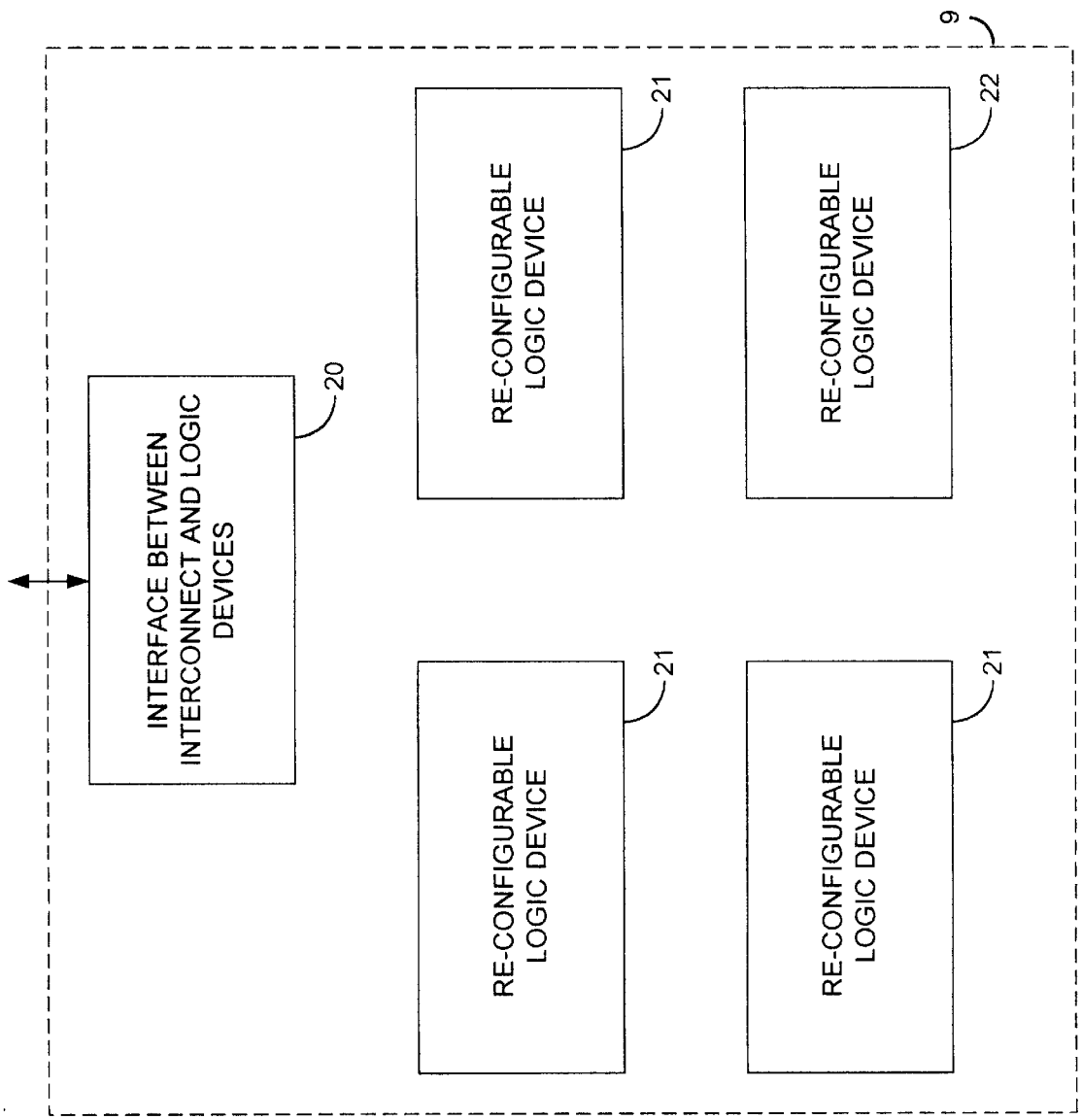
FIG. 2 illustrates an example of an optional independent re-configurable logic block within the underlying hardware apparatus.
Figure 3:
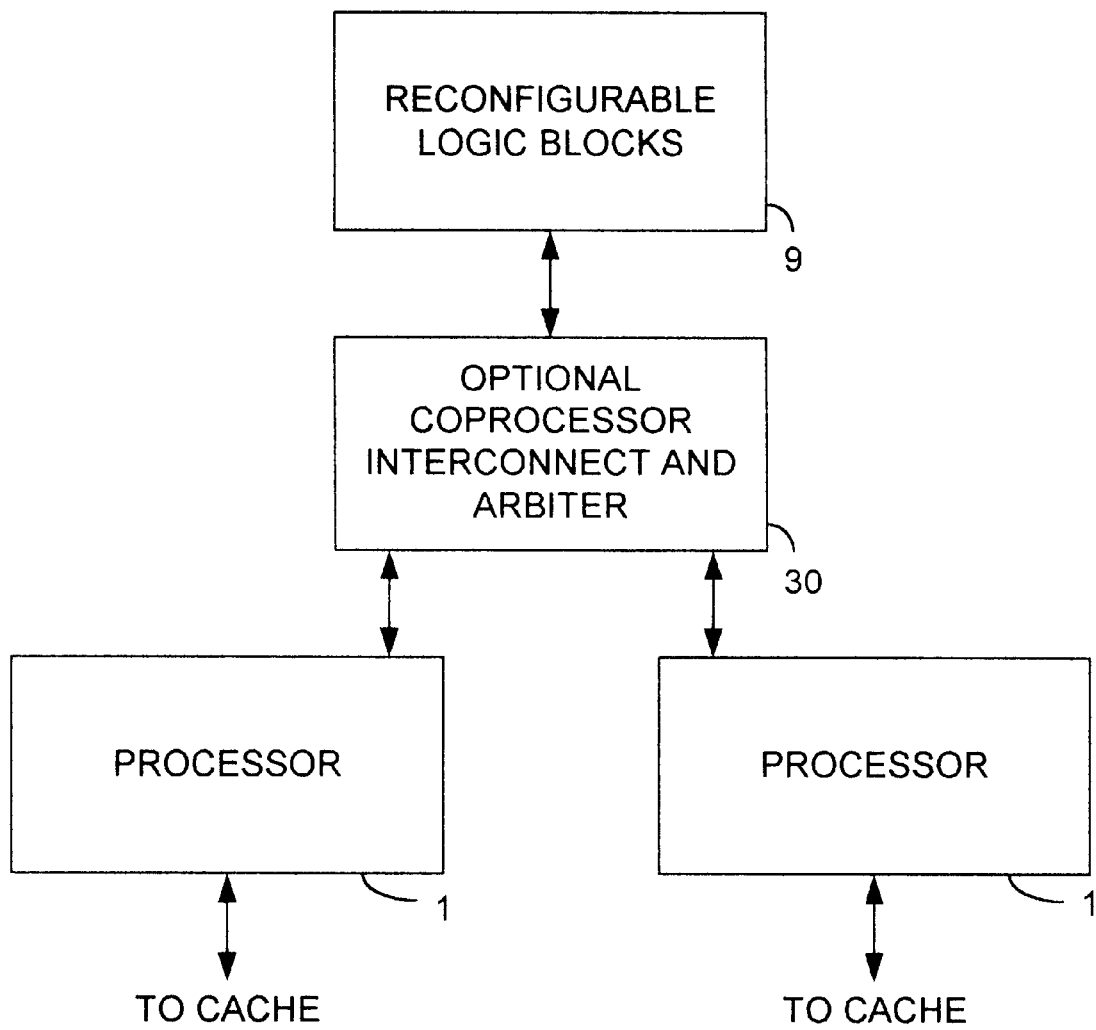
FIG. 3 illustrates an example of an optional re-configurable logic block connected as part of a one or more processors.

The underlying hardware apparatus is introduced in FIGS. 1, 2 and 3. FIG. 1 shows the overall apparatus structure. FIG. 2 shows a detail of optional Block 9. FIG. 3 shows optional re-configurable logic in Blocks 1 and 2.

In FIG. 1, Blocks 1 through 8 represent a conventional, cache-coherent multiprocessor. With the omission of Blocks 2, 4 and 6, the hardware apparatus may also take the form of a uniprocessor node involving Blocks 1, 3, 5, 7 and 8. To this conventional uni-processor, a message interface (Block 10) may be added to implement a conventional massively parallel machine using protocols such as the IEEE Std. 1596 Scalable Coherent Interface. Conventional I/O devices such as a graphical user interface, local area network, and disk subsystem are assumed to be present (although not shown) using conventional means well-known to those skilled in the art.

Re-configurable logic blocks, Block 22, may optionally be inserted into the conventional uni-processor, shared memory multiprocessor or massively parallel processor described above. As isolated devices, re-configurable logic blocks are available in a wide variety of variations for which both the behavior of individual cells and interconnects may be altered (reconfigured) while the device is installed in a system, sometimes on a cycle-by-cycle basis.

In order to support compilation and simulation/execution via a compiler-oriented database, one or more re-configurable logic blocks may optionally be integrated into a system using a shared memory interface (as in Block 9), a message-based interface (as in Block 9) or as a part of the execution pipeline available to one or more processors (Blocks 30 and 22 in FIG. 3). Without loss of generality, one or more re-configurable logic blocks (Block 21) may be replaced by conventional memory arrays, fixed-logic devices (such as an analog to digital convert) known to the compiler and/or controllers.

Figure 9:
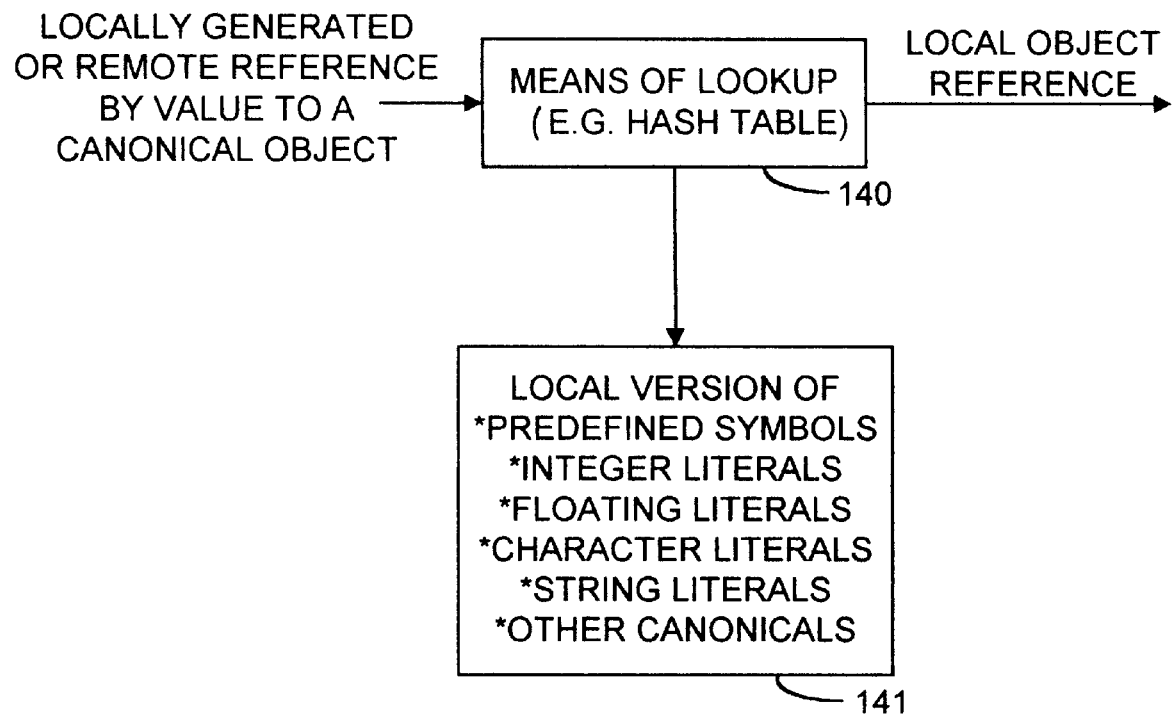
FIG. 9 illustrates a means for locating the local representation of canonically defined objects within the compiler-oriented database apparatus.

FIG. 9 details the internal structure of one (or more) re-configurable logic devices (Block 21) integrated into the hardware apparatus via a shared memory or message passing interface to the local interconnect (Block 20 to Block 7). In order to reconfigure the behavior and interconnect of Block 9 and Block 21, one or more addresses may be mapped into the interconnect (Block 7) memory map or I/O map such that reconfiguration information may be written (or read) from Block 9. One means of writing (and reading) such interconnect information is to assign a specific memory address to the configuration of each re-configurable logic gate/element and interconnect point within Block 21. The value written (or read) from the address determines the gate/element behavior or interconnect routing. An alternative means is to associate two addresses, one used to specify a specific gate/element or interconnect routing point, the other address to specify the gate/element or interconnect routing point value. Alternative the same configuration information may be written (read) by processors via the message interconnect (Block 13) and message interface (Block 10). Other means of reconfiguring logic Block 9 are known to those skilled in the art from an extensive history of mapping I/O and memory-mapped I/O devices into a shared memory multiprocessor or massively parallel processor's system architecture.

Once the re-configurable logic (Block 9) has been configured by software running on one or more processors, interface Block 9 may be used so that the re-configurable logic (Block 9) is able to evaluate the behavior of (embedded) processes using the same forms of inter-process and inter-processor communication conventionally used by shared memory and massively parallel processors. These mechanisms, well known to those skilled in the art, include point-to-point and multi-cast messages, interrupts and coherent access to shared memory. In essence, once re-configured, Block 9 may participate in the system architecture as a fixed-program, highly-parallel, multi-tasking processor.

Alternatively, re-configurable logic blocks described above (Block 9) may be integrated into the instruction execution pipeline of one or more processors (Block 1), as shown in FIG. 3. One or more instruction set encodings (commonly known as "op-codes" may be reserved for functional implemented by an optional coprocessor, interconnect, arbiter and re-configurable logic block (Blocks 9 and 30). When such an opcode is reached while executing an instruction stream within a processor, the opcode, extended opcodes (if any) and input operands are fetched by the processor (Block 1), sent via the coprocessor interface, interconnect and arbiter to a suitably configured re-configurable logic block (Block 9), the re-configurable logic block executes the operation denoted by the information supplied by the processor and at some later point returns a completion status and optional results to the processor originating the operation (Block 1), allowing this processor to complete execution of the original instruction (possibly out of order). Details of the arbiter and interface will be well-known to those skilled in the art from designs such as the 68000 family coprocessor interface or more tightly integrated, proprietary interfaces.

Instructions executed by the re-configurable logic block may be used to re-configure the gate/element behavior or interconnect routing within the re-configurable logic block, access memory, controllers or devices embedded within the re-configurable logic block or read state resulting from prior operations within the re-configurable logic block. As with the shared memory and message-based use of Block 9, clients of the compiler oriented database are responsible for recognizing installed re-configurable logic blocks (including their capabilities via hardwired configuration state) and generating suitable reconfiguration information as is conventionally done when a compiler emits instructions into file (or memory) for a conventional processor.

Figure 4:
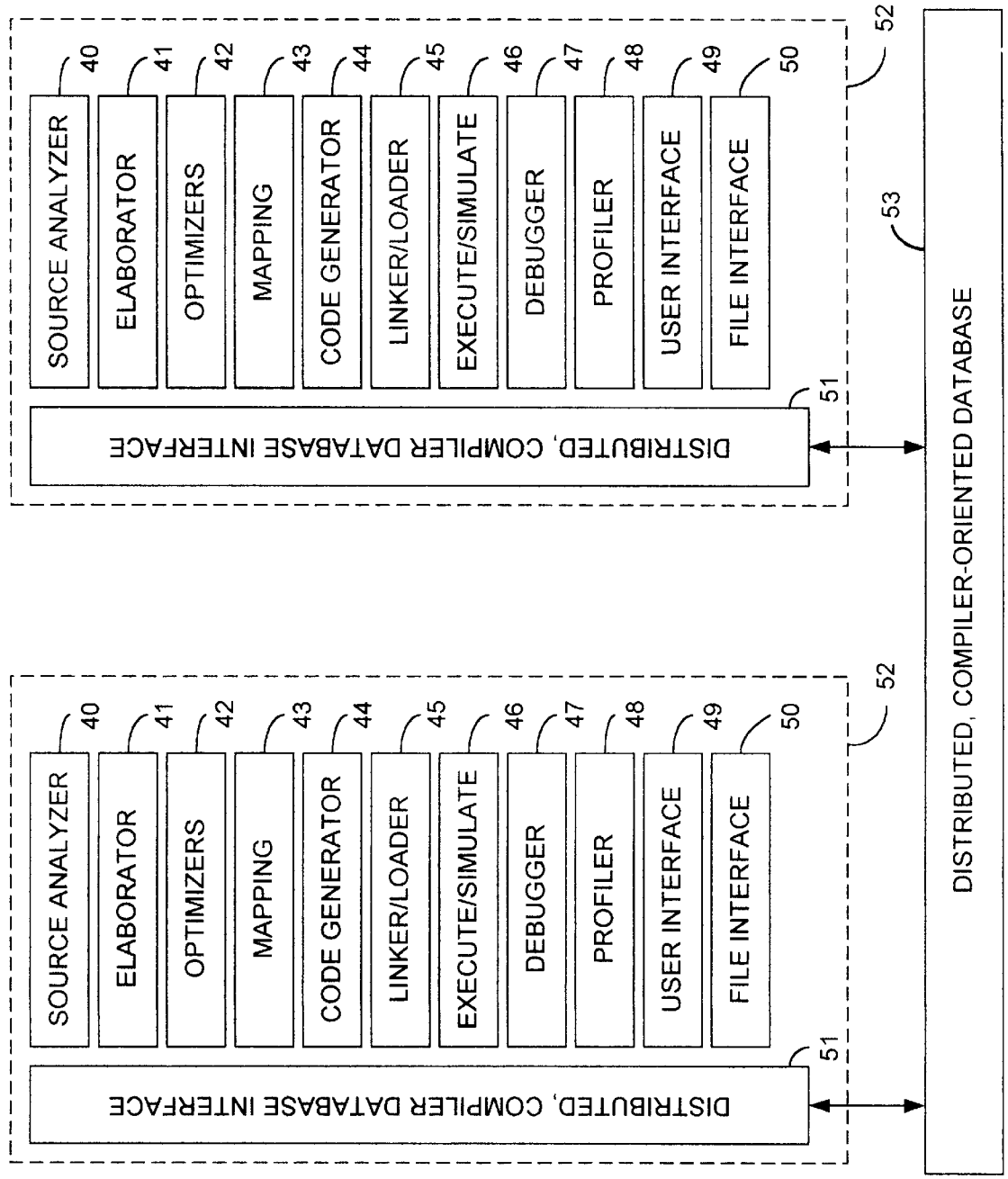
FIG. 4 illustrates the connection of example clients to the distributed, compiler-oriented database apparatus.
Figure 5:
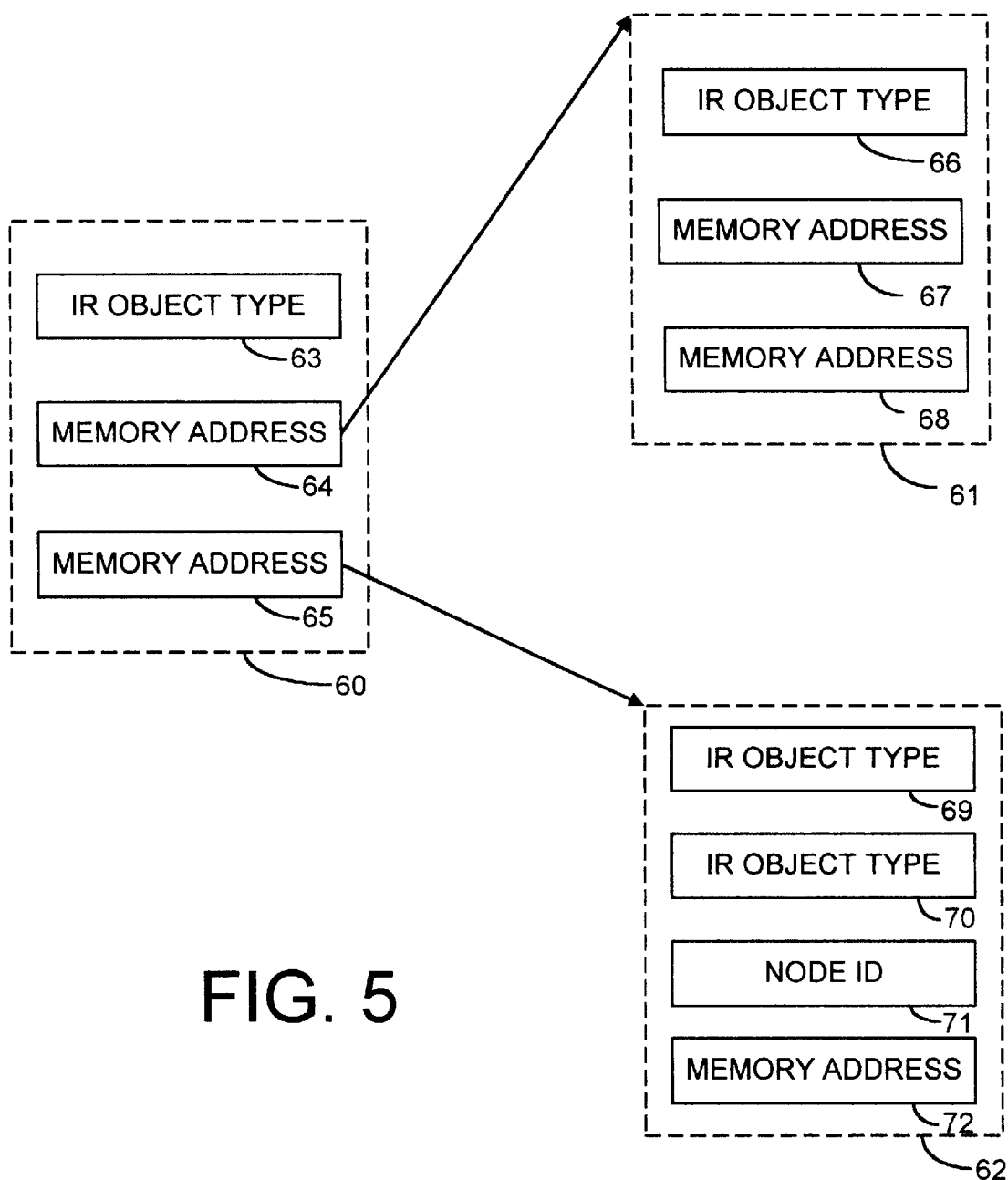
FIG. 5 illustrates a means by which a database object makes reference to a second, locally resolved database object and a third proxy database object making reference to a fourth object present only on a remote node within the compiler-oriented database apparatus.

The memory (Block 8), caches (Block 3 and 5) and ultimately processor (Block 1) of the underlying hardware apparatus may then be programmed to implement a distributed, compiler-oriented database and associated client apparatus, as shown in FIG. 4. The resulting apparatus may then be used in compilation as well as simulation/execution operating modes in order to compile and simulate/execute larger programs/hardware models in less time.

The distributed, compiler-oriented database retains a collection of intermediate representation database objects specifically suited for compilation and simulation/execution operating modes of the invention. Illustrative examples of the database objects include an object denoting a literal identifier "i", a declaration, an expression, a concurrent statement, an elaborated process, an elaborated driver, the instantaneous state of a process being simulated/executed, the time/value change history of an inter-process message queue or shared variable over some interval of time or the content of a user-defined file opened for reading or writing by an executing program and/or model. The database may be distributed among the memory, swap space and file system of multiple processing nodes. Each object has a unique observable value coherent across the distributed, compiler-oriented database, no matter which computing node is doing the reference.

General techniques for implementing the distributed, compiler-oriented database are well-known to those skilled in the art by adaptation from the general-purpose parallel database or distributed shared memory literature. Unique aspects of this invention include apparatus for the compiler and simulation/execution operating modes (such as clients illustrated by example Blocks 40 through 50), which are not present in general-purpose database systems, and apparatus for caching the specific compiler or simulation/execution objects required by compilation and simulation/execution operating modes. In contrast, distributed shared memory systems provide remote access to contiguous, fixed length and fixed granularity intervals of the address space rather than a collection of semantically meaningful but discontiguous objects, such as a tree of declarations within a single declarative region of the compile-time representation.

The distributed, compiler database interface provides a programming language interface (Block 51) through which clients (such as those illustrated in Blocks 40 to 50) may create, request copies of pre-existing objects, atomically update, release and free collections of compiler and simulation/execution related database objects. General means to implement such programming language interfaces are already well-known to those skilled in the art from previously published work such as the AIRE/CE programming language interface for uniprocessor systems implementing the VHDL hardware description language.

In order to appreciate some of the compiler and simulation/execution clients which are suitable for connection to the compiler oriented database, the following paragraphs describe clients illustrated in Blocks 40 to 52 within the illustrated processing node (Block 52). However note that not all of the illustrated clients must be present on a given processing node, nor are other clients related to compilation or simulation/execution precluded from connecting to the compiler-oriented database on one or more nodes. In particular, some nodes are likely to have user interface clients while other nodes are more likely to have background processing clients such as an elaborator, optimizer or code generator.

The source code analyzer (Block 40) receives a command from the distributed, compiler oriented database interface (Block 51) directing the translation of a fragment (with context related to the compiler-oriented database) or complete source code file constituting a program or hardware model into the compiler-oriented database's representation. Dependencies encountered during analysis of a given file, such as a VHDL use clause referring to another declarative region, require a delay in analysis until the compiler-oriented database provides a local copy of the used declarations and related database objects. In order to minimize subsequent delays, a declarative region used by the source analyzer on one computing node may trigger pro-active transmission of the referenced declarative region to other nodes doing source. Such caching heuristics are language specific and user-specific directed by information learned during operation and stored with the persistent form of the distributed, compiler-oriented database.

The elaborator (Block 41) re-writes previously analyzed information from the distributed, compiler-oriented database so as to selectively flatten the design and subprogram/function hierarchy or propagate constraints between a subprogram/function definition and its call site within other parts of the program or hardware model. The elaborator utilizes global visibility throughout the database and the ability to re-use collections of database objects which remain the same before and after analysis. For example, the analyzer may separate the set of declarations in a process having constant type and size from those with varying type and or size depending on the point at which an instance is created or a subprogram/function called. The elaborator then only creates new, elaborated database objects for those objects with specific type or size, utilizing the distributed, compiler-oriented database to reduce memory and object creation/maintenance overhead. The elaborator client may take advantage of the distributed database in order to spawn sub-elaboration of component instances, object instances or subprogram hierarchies on other nodes. Using complexity metrics estimated during analysis, stored with the database and recursively propagated up the elaboration tree, the elaborator may use heuristics to spawn elaboration on other processing nodes so that the result of elaboration is a good first-pass partition of the program or design onto processors.

The optimizer client (Block 42) utilizes global visibility into the design database in order to enable distributed, global analysis and rewriting transformations, such as those described by the inventor in previous publications [Willis91, Willis92]. Without the selective, global visibility into the entire analyzed, elaborated and simulation/execution database, optimizers must make decisions with less complete information, resulting in generally less optimal optimizations. Direct communication via the database with other optimizers allows sharing of intermediate optimization analysis, such as the data-flow analysis of a subprogram. In the absence of the disclosed distributed, compiler oriented database the optimizers running in separate, parallel compilations must frequently re-create analysis of common components and subprograms.

The mapping client (Block 43) iterates on the assignment of workload to processing nodes initiated during parallel elaboration and quasi-statically schedules evaluation of multiple execution threads (processes) on each processing node [Willis95]. Critical path analysis, annotated in the compiler-oriented database again provides the global viewpoint from which effect, quasi-static mapping and scheduling can be accomplished. Mapping clients on each processing node with simulation or execution workload exchange workload until arriving at a load balance predicted to maximize the simulation/execution rate. In the absence of such global, compile-time information, parallel simulation/execution environments depend on runtime load balancing, resulting in greater runtime overhead and decreased simulation/execution performance.

The code generation client (Block 44) follows mapping and scheduling by emitting pseudo-code, processor executable or re-configurable logic configuration information directly into the code generator's address space, into an associated operating system process on the same processing node or into a conventional file for later execution. Emitting executable and configuration information directly into the same operating system process as the code generator or a tightly coupled process provides for rapid, localized and incremental response to changes in the distributed, compiler-oriented database. Changes may be driven by breakpoints for symbolic debug, insertion of profiling code, insertion of intentional faults (for fault simulation) or other deltas on the database impacting the simulation/execution.

The linker/loader (Block 45) works tightly with both the compiler-oriented database and the code generator in order to resolve addresses from symbolic values to actual in-memory addresses, to relocate code fragments in order to improve cache performance, to insert cache control instructions into the executable and to link/load external libraries into the address space also target by the code generator. Use of a common, compiler-oriented database provides for rapid, fine-grain cooperation between the code generator and scheduler which would be infeasible if undertaken by conventional, distinct operating system processes communicating through a file or unidirectional pipeline.

The execute/simulate client (Block 46) utilizes both symbolic and control information from the compiler-oriented database in order to properly load local memories, shared memories and re-configurable logic and control the execution. The execute/simulate client again benefits from fine-grain access to the global, compiler-oriented database and address space used as a target by the code-generator and linker/loader. Programming language interfaces which call for modification of the program or design being simulated can readily and efficiently be accommodated through calls from the simulating/executing address space resulting in changes to the compiler-oriented database and an incremental recompile command sent to the code generator and linker/loader client. Such tight modification cycles are in-feasible with conventional compilation and execution environments where the compiler and execution/simulation environment are not simultaneously active and in bi-directional communication; as a result the code originally generated must have substantial flexibility and thus reduced simulation/execution performance to allow the required modification. Control directives originate with the user interface or debugger and coherently communicate through the compiler-oriented database to each execute/simulate client on every processing node participating in the parallel compilation and simulation/execution.

The debugger client (Block 47) interfaces between the user and the compiler-oriented database in order to direct execution, breakpoints, set state and read state. While conventional debuggers reach directly into the executable, the compiler-oriented database approach allows the debugger to make suitable changes in the compiler-oriented database from one processing node (with a suitable user interface) and initiate commands via the database which are seen by the source code analyzer through the code generator and linker/loader. Since relatively little code is actually debugged in a given simulation/execution run, this approach allows most code to be generated for maximum performance; when debug is required the appropriate code fragments can be recompiled and state mapped in order to generate a region of the executable with sub-optimal performance yet good correlation with the original source code. Aided by full information contained in the compiler-oriented database, the code generator and linker are best equipped to map state on the stack, signal queues and static areas between optimized and debug code sequences. Such mapping is difficult or impossible for a debugger operating directly on an executable image, guided only by a conventional symbol table.

Debugging simulations is complicated optimizing and mapping and scheduling transformations which attempt to execute hardware models in a locally "cycle-driven" mode where possible, preserving information dependency information but not local timing detail. When debugging, profiling or other user-interface functions enter an area of cycle-driven code from a full-timing section of the simulation, preserving visible semantics of the hardware model requires a local code and state transformation from cycle-driven to full timing semantics, which again is made feasible by the ready availability of the compiler-oriented database. Generally timing state is generated by locally re-running the simulation from known state into the new, full-timing code to generate full-timing state for debug. Such debug-oriented, incremental timing capability is an important source of performance when compiling libraries with substantial timing detail, only select portions of which are critical to hardware model performance. This situation often occurs when compiling and simulating VHDL's VITAL timing primitives. After debugging, profiling or other user interface activities leave the region of code in question, the higher-performance code implementation may be restored to increase simulation performance. Such rapid and localized change to the executable depends on the fine-grain compiler-oriented database structure for both data and command communication.

The profiler client, Block 48, provides the user with a means to probe aggregate simulation and execution behavior. This is in contrast to a debugger, which typically examines a small number of executable/simulation regions in great detail. Profiling may report on the code pathways actually executed by a particular simulation/execution run, on the time spent in each executable/simulation region, or may even consider the aggregate properties of values assigned to specific state. Especially if complex profiling criteria are established, the ability to make rapid changes in the executable/simulation, enabled by the compiler-oriented database, is again critically important.

The user interface client, Block 49, provides for a user's control over the entire compilation and execution/simulation process. Again, by interfacing to other clients via the compiler-oriented database, a wide variety of user interfaces may be developed without direct dependency on other client interfaces. This facilitates independent development of compiler control interfaces, command interpreters, schematic display schema, waveform displays and analysis tools. Since information and command protocols are defined by the compiler-oriented database socket and not the other specific clients installed, user interface development has a greatly simplified interface, either decreasing the user interface development cost or allowing for enhanced functionality.

The file interface client, Block 50, provides for the distribution of file I/O across the message interconnect and the coherent re-assembly of file I/O resulting from execution/simulation. File access via the compiler-oriented database facilitates generation of optimal I/O routines for user-defined types relative to runtime composition of composite type I/O, avoids need for the file interface to directly deal with intermixed reads and writes executed on hardware with distinct and incompatible data type encodings. The critical enabling step is that the communications interface also has semantic information about the information being transmitted, which is missing in conventional environments separating compilation and execution/simulation.

The above clients illustrate unique and novel apparatus and operating modes enabled by linking clients through a compiler-oriented database rather than conventional coarse, unidirectional file (or pipeline) linkages. For someone skilled in the art of parallel database design, the construction of such a compiler-oriented database can borrow, by extension, substantial technology. However in order to make the discussion concrete, the following section discusses one means of implementing a distributed, compiler-oriented database.

FIGS. 5 through 9 illustrate one means of implementing a distributed, compiler-oriented database. One of the most critical issues in implementing such a database is provision of an efficient means to reference objects originally created or currently "resident" on another node. Previous approaches have included denoting each pointer as a <node, address> tuple directly or within a single memory address. Using the first approach delays every pointer access in the database in order to determine if the node designator in the tuple corresponds to the current node or if a remote node is required. The first approach also effectively doubles the memory required to represent the database since each pointer becomes twice the size of a memory address and most of a database consists of pointers. The second approach eliminates the space penalty but limits the total database size to the address range addressed by a pointer. It also requires very complex, machine-dependent trap handlers which allow back-patching a faulted address once the required objects have been cached locally. Since the trap handler is often a critical section of code within which one may not block while waiting for a non-local response, callbacks are a practical requirement so that the patch occurs after the non-local object arrives. With the above deficits in mind, a third approach is disclosed in the preferred embodiment of the current invention.

Each object in the database is associated with a specific intermediate representation type (as in Block 63). Various means of association are possible including an implementation internal pointer to the class definition (such as a C++ "vptr"), an explicit integer denoting the type or an enumeration value. By reference to the IR object type, the set of valid operators and internal data is defined. Examples of common IR types include literals, declarations, collections, names, expressions, statements and block structure [Willis96]. Additional IR types required for the distributed, compiler database beyond those commonly available internal to a conventional compiler include various remote object proxies, inter-client commands, inter-client responses and simulation/execution state (including representation of stack frames, static areas and communications within the simulation/execution).

Most pointers refer to an object local to a node (as in Block 64, a memory address, pointing to the local object denoted by Block 61. Generally a small number of pointers refer to objects on other nodes (as in the memory address in Block 65 referring to the remote object of type 1 denoted by Block 62) by way of a remote (or proxy) object. The first kind of remote object include the actual type of the remote object being denoted (Block 70), the node on which the reference copy exists (Block 71) and the memory address on the remote node (Block 72). Thus the majority of pointers occupy the minimum memory, that required for a single memory address. A small number of off-node references occupy storage approximately twice the size (as shown in Block 62) of the <node, address> approach.

Figure 6:
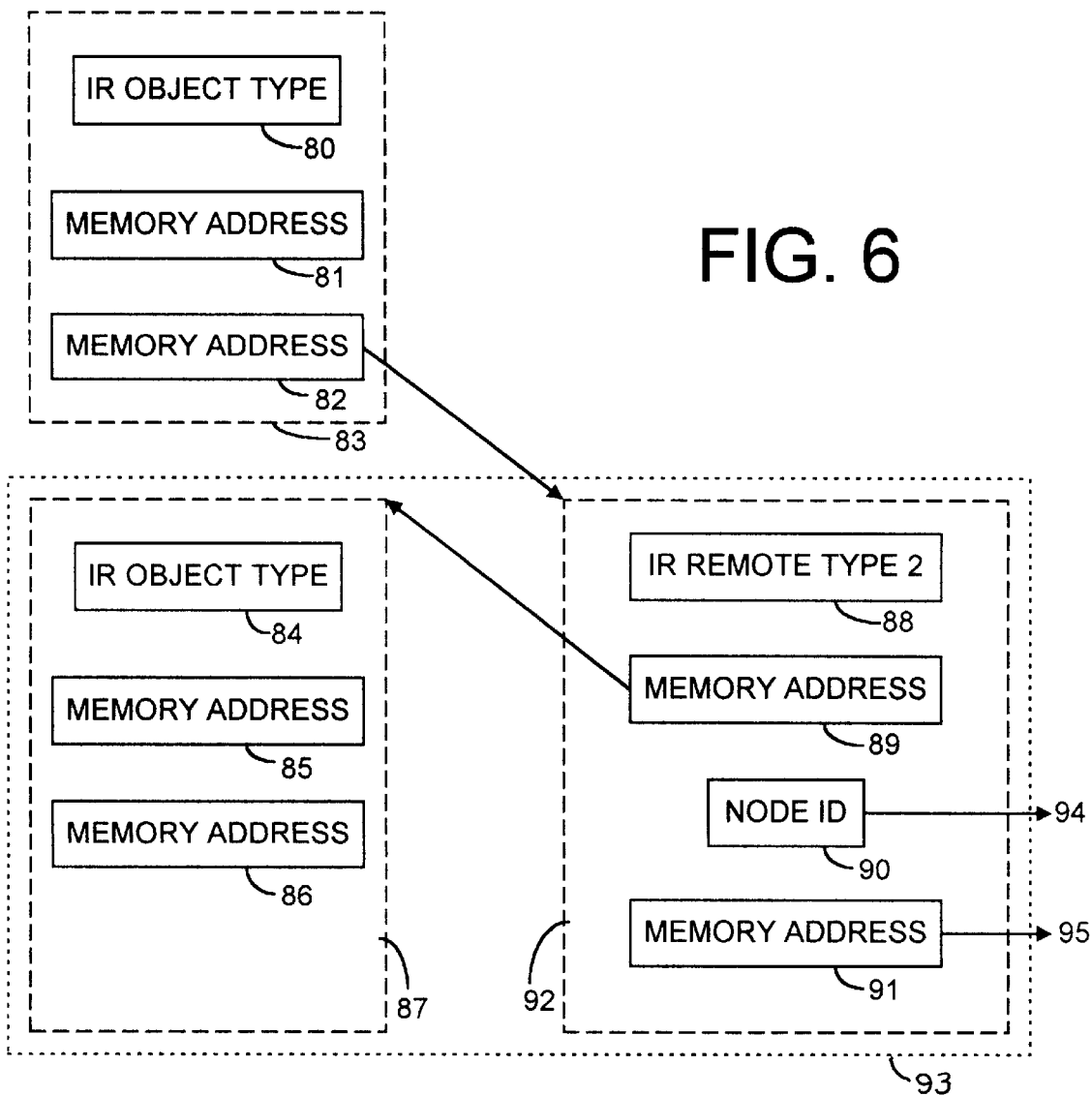
FIG. 6 illustrates a means by which a proxy database object caching a local copy of a remote object within the compiler-oriented database apparatus.

In FIG. 6, when a reference (or method call) is made to a remote object of Type 1 (Block 69), suitable for the actual object type (Block 70), the distributed, compiler-oriented database changes the remote (or proxy) object into a Type 2 reference in which the object type (Block 70) is replaced by a pointer to a locally "cached" copy of the object (Block 87). With one memory indirection, the cached copy functions locally as if it were resident on the local node. Based on the type of object referenced, available memory and bandwidth, as well as usage patterns, the distributed, compiler-oriented may use domain knowledge in order to fetch a locally cached copy of more than just the immediately requested object. For example, reference by selection to a declarative region may initiate transfer of the entire contents of the declarative region rather than just one declaration. In a second example, fetch of a declaration may initiate retrieval of the declaration's type (and recursively its type definition). In a like manner the distributed, compiler-oriented database may choose to delete cached copies by switching the remote object back to a Type 1, perhaps in order to gain local memory or to reduce "cache-coherence" overhead.

Figure 7:
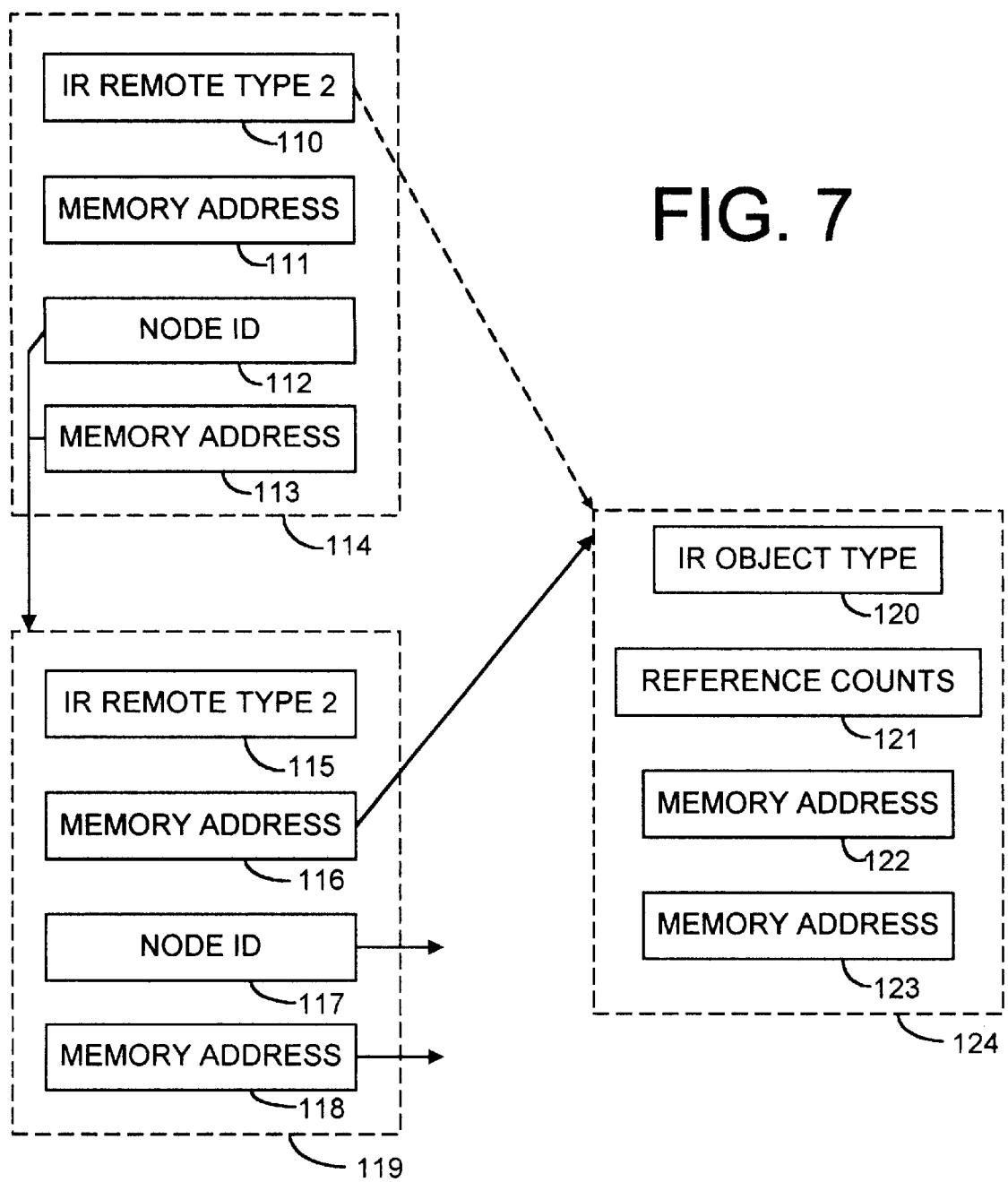
FIG. 7 illustrates a means for providing coherence among multiple, remote proxies within the compiler-oriented database apparatus.

As shown in FIG. 7, some objects may be cached locally for purposes of update; in such situations only one copy must be mutable at any point in time and all other objects must be kept in a coherent state. For example, a processing node supporting a user interface may write to a command stream (list) which must be coherently visible to all processing nodes which may implement the command. As shown in FIG. 7, a Type 2 remote object may denote another Type 2 remote object (Blocks 112 and 113 denote Block 119). The second Type 2 remote object in turn may be a local memory address (as shown) or may use a node ID and memory address (Blocks 117 and 118) to denote an object on a third node (not shown).

Figure 8:
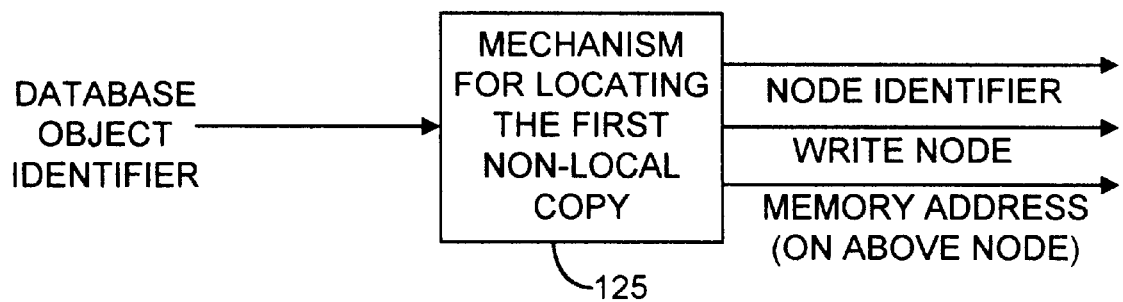
FIG. 8 illustrates a means for locating the first non-local copy of a specified object within the compiler-oriented database apparatus.

In order to maintain coherence, the distributed, compiler oriented database must associate a database object with the first non-local copy, as shown in FIG. 8). Since most objects on a node are only locally referenced, it would not be space-efficient to pack such information into all objects in the database (although this would be logically correct). Instead some means of locating the first non-local copy's node identifier, write status and memory address (on the remote node) may be maintained on the processing node owning the original object. Many such means are known to those skilled in the art, including fully associative hardware or software hash tables.

Numerous caching schema are known to those skilled in the art; the above schema only describes one means (the preferred embodiment) of implementing coherent, distributed databases for compilation. Many other techniques could be adapted from the caching literature as a means of implementing the caching mechanism required by the overall invention.

Some objects, such as predefined symbols defined by a language or environment, integer literals, floating point literals, character literals, string literals and other canonical objects generally only have one representation per processing node. For example, there is only one representation of the integer 3. There is no need to keep such objects coherent for update. Thus the compiler-oriented database may be optimized by mapping such canonical objects (by value) into the local representation rather than performing non-local caching. Such a means is shown in FIG. 9.

Over time, objects in the database may non-longer be reachable. Where possible and safe, it is useful to delete all cached copies of such objects and the original object. Database operation is accelerated by maintenance of either a reference count or other forms of garbage collection apparatus known to those skilled in the art.

Figure 10:
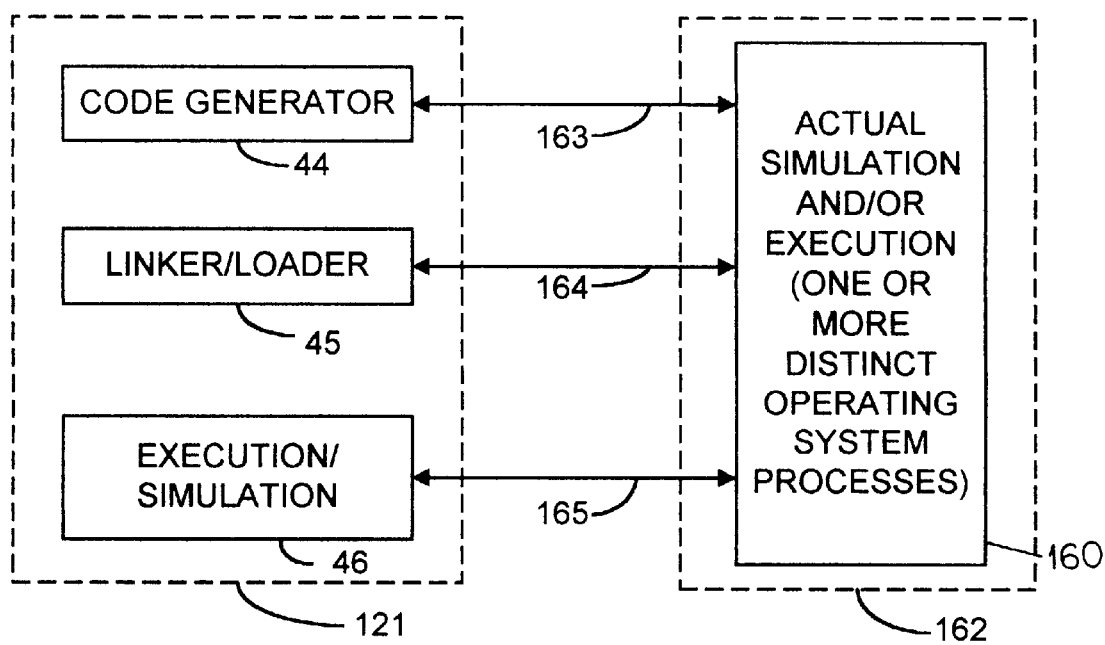
FIG. 10 illustrates a means by which client functionality can partitioned into two or more operating system processes.

FIG. 10 illustrates a modified form of the code generator (Block 44), linker/loader (Block 45), and execution/simulation (Block 46). Rather than compiling into the same address space as the clients, the executable/simulation exists in a distinct operating system process (Block 162). The code generator, linker/loader and execute/simulation control read and write the distinct simulation/execution operating system process on the node via mechanisms well-known to those skilled in the art such as shared memory, inter-process communication or operating system messages (shown as 163, 164, 165).

Separation of compiler-oriented database clients from the actual executable has several critical benefits. First, the entire virtual address space provided by the operating system to each process is available to both the database and clients (one process) and the simulation/executable (another process). Such partitioning accommodates older architectures and operating systems limited to 2 billion byte virtual memory regions and avoids the need for extended address representations on newer architectures and operating systems (with the associated increase in memory consumption). Second, the partition increases system integrity since maloperation of the simulation/execution cannot directly alter the code or data structures associated with the database or its clients. Finally the partition addresses code or model security issues which might arise if a library or component hardware model is received, decrypted, compiled and linked with other program or user code which attempted to get direct access to the more abstract, compiler-oriented database representation (perhaps for reasons of reverse engineering). The suitable operating system protections in place, the dual process approach shown in FIG. 10 greatly complicates such reverse engineering.

Having illustrated and described the principles of the invention in the preferred embodiment, it should be apparent to those skilled in the art that the invention can be modified in arrangement and detail without departing from such principles. We claim all modifications coming within the scope and spirit of the following claims.

What is claimed:

1. A parallel processor system with at least one node programmed to execute a distributed, compiler-oriented database, the parallel processor system including compilation, simulation and/or software execution operating modes, and comprising:

at least two processors;

memory operationally connected to at least one processor wherein the memory is either local memory or shared memory;

interconnection mechanisms for connecting the at least two processors and the memory; and re-configurable logic elements, wherein the programmed node is augmented to include a plurality of clients which may perform one or more of the following functions on the distributed, compiler-oriented database selected from a group of:

incremental analysis of source code into the database;

incremental elaboration and/or in-lining of previously analyzed information into the database to yield new or revised database entries;

incremental optimization which transform database contents to yield more efficient simulation, more efficient execution or more observable execution;

incremental code generation, assembly and linking which transform database contents to yield representations directly executable on a combination of programmable processors and reconfigurable logic elements;

runtime, I/O and file systems operations which provide for scheduling, communication and callbacks within and among directly executable simulations/executions;

debugging which provide for interactively starting, stopping and probing the state of simulation/execution;

profiling or event logging of simulation/execution in order to make simulation/execution result accessible to external tools or users; and graphical interactive user interface transfers wherein the database may coherently cache information having utility on said at least one node.

2. The parallel processor system of claim 1 wherein at least one of the at least two processors is augmented with re-configurable logic execution pipelines dispatched by action of a register to register instruction from an instruction stream of at least one of the at least two processors.

3. The parallel processor system of claim 1 wherein the client operates between at least two communicating operating system processors so as to provide additional addressable memory, software protection and to emulate a target software execution environment.

4. The parallel processor system of claim 2 wherein the client operates between at least two communicating operating system processes so as to provide additional addressable memory, software protection and to emulate a target software execution environment.

5. The parallel processor system of claim 1 wherein the plurality of clients incrementally change source code through incremental and coherent changes in the database to achieve incrementally altered and repartitioned simulation/execution between processors and re-configurable logic devices, the changes in source code preserve simulation/execution state in order to meet evolving requirements for interrupting simulation/execution.

6. The parallel processor system of claim 1 wherein the interrupting of simulation/execution may include actions selected from the group of triggering callbacks, callbacks, substituting event-driven/cycle-driven/continuous-domain algorithms or generate intermediate simulation/execution state require for more detailed debug, display or profiling.

7. The parallel processor system of claim 2 wherein the plurality of clients incrementally change source code through incremental and coherent in the database to achieve incrementally altered and repartitioned simulation/execution between processors and re-configurable logic devices, the changes in source code preserve simulation/execution state in order to meet evolving requirements for interrupting simulation/execution.

8. The parallel processor system of claim 7 wherein the interrupting of simulation/execution may include actions selected from the group of triggering callbacks, callbacks, substituting event-driven/cycle-driven/continuous-domain algorithms or generate intermediate simulation/execution state required for more detailed debug, display or profiling.

9. The parallel processor system of claim 1 wherein relation information contained on the database relating information resident on a node and information only present on a remote node is represented by a remote proxy record, wherein the remote proxy record may provide for coherent caching of the information on the remote node using memory availability and coherence to limit cached copy lifetime.

10. The parallel processor system of claim 2 wherein relation information contained on the database relating information resident on a node and information only present on a remote node is represented by a remote proxy record, wherein the remote proxy record may provide for coherent caching of the information on the remote node using memory availability and coherence to limit cached copy lifetime.

11. A parallel processor system of claim 1 wherein analysis, elaboration and runtime dependency relations between database information may trigger compilation, simulation or execution client activity on the same or other nodes such that the database couples the trigger and the related compilation, simulation or execution, independent of the location of information and clients on various nodes and components of the node.

12. A parallel processor system of claim 2 wherein analysis, elaboration and runtime dependency relations between database information may trigger compilation, simulation or execution client activity on the same or other nodes such that the database couples the trigger and the related compilation, simulation or execution, independent of the location of information and clients on various nodes and components of the node.

13. A parallel processor system of claim 1 wherein the elaborator client operation can produce elaborated database objects prior to code generation and wherein database objects resulting from elaborated re-use database objects resulting from operation of the analyzer client or objects generated by previous operation of the elaborator client.

14. A parallel processor system of claim 2 wherein elaborator client operation can produce elaborated database objects prior to code generation and wherein database objects resulting from elaboration re-use database objects resulting from operation of the analyzer client or objects generated by previous operation of the elaborator client.

15. A parallel processor system with at least one node programmed to execute a distributed, complier-oriented database, the parallel processor system including compilation, simulation and/or software execution operating modes, and comprising:

at least two processor;

memory operationally connected to at least one processor wherein the memory is either local memory or shared memory; and interconnection mechanisms for connecting the at least two processors and the memory;

wherein the programmed node is augmented to include a plurality of clients which may perform one or more of the following functions on the distributed, compiler-oriented database selected from a group of:

incremental analysis of source code into the database;

incremental elaboration and/or in-lining of previously analyzed information into the data base to yield new or revised database entries;

incremental optimization which transform database contents to yield more efficient simulation, more efficient execution or more observable execution;

incremental code generation, assembly and linking which transform database contents to yield representations directly executable on a combination of programmable processors and reconfigurable logic elements;

runtime I/O and file systems operations which provide for scheduling communication and callbacks within and among directly executable simulations/executions;

debugging which provide for interactively starting, stopping and probing the state of simulation/execution;

profiling or event logging of simulation/execution in order to make simulation/execution results accessible to external tools or users; and graphical interactive user interface transfers wherein the database may coherently cache information having utility on said at least one node.

16. The parallel processor system of claim 15 wherein the client operates between at least two communicating operating system processes so as to provide additional addressable memory, software protection and to emulate a target software execution environment.

17. The parallel processor system claim 15 wherein the plurality of clients incrementally change source code through incremental and coherent changes in the database to achieve incrementally altered and repartitioned simulation/execution between processors and re-configurable logic devices, the changes in source code preserve simulation/execution state in order to meet evolving requirements for interrupting simulation/execution.

18. The parallel processor system of claim 17 wherein the interrupting of simulation/execution may include actions selected from the group of triggering callbacks, callbacks, substituting event-driven/cycle-driven/continuous-domain algorithms or generate intermediate simulation/execution state required for more detailed debug, display or profiling.

19. The parallel processor system of claim 15 wherein relation information contained on the database relating information resident on a node and information only present on a remote node is represented by a remote proxy record, wherein the remote proxy record may provide for coherent caching of the information on the remote node using memory availability and coherence to limit cached copy lifetime.

20. A parallel processor system of claim 15 wherein analysis, elaboration and runtime dependency relations between database information may trigger compilation, simulation or execution client activity on the same or other nodes such that the database couples the trigger and the related compilation, simulation or execution, independent of the location of information and clients on various nodes and components of the node.

21. A parallel processor system of claim 15 wherein the elaborator client operation can produce elaborated database objects prior to code generation and wherein database objects resulting from elaboration re-use database objects resulting from operation of the analyzer client or objects generated by previous operation of the elaborator client.

22. The processor system of claim 15 wherein at least one of the at least two processors is augmented with re-configurable logic execution pipelines dispatched by action of register to register instruction from an instruction stream of at least one of the at least two processors.

23. The parallel processor system of claim 22 wherein the client operates between at least two communicating operating system processors so as to provide additional addressable memory, software protection and to emulated a target software execution environment.

24. The parallel processor system of claim 22 wherein the plurality of clients incrementally change source code through incremental and coherent changes in the database to achieve incrementally altered and repartitioned simulation/execution between processors and re-configurable logic devices, the changes in source code preserve simulation/execution state in order to meet evolving requirements for interrupting simulation/execution.

25. The parallel processor system of claim 24 wherein the interrupting of simulation/execution may include actions selected from the group of triggering callbacks, callbacks, substituting event-driven/cycle-driven/continuous-domain algorithms or generate intermediate simulation/execution state required for more detailed debug, display or profiling.

26. The parallel processor system of claim 22 wherein relation information contained on the database relating information resident on a node and information only present on a remote node is represented by a remote proxy record, wherein the remote proxy record may provide for coherent caching of the information on the remote node using memory availability and coherence to limit cached copy lifetime.

27. A parallel processor system of claim 22 wherein analysis, elaboration and runtime dependency relations between database information may trigger compilation, simulation or execution client activity on the same or other nodes such that the database couples the trigger and the related compilation, simulation or execution, independent of the location of information and clients on various nodes and components of the node.

28. A parallel processor system of claim 22 wherein the elaborator client operation can produce elaborated database objects prior to code generation and wherein database objects resulting from elaboration re-use database objects resulting from operation of the analyzer client or objects generated by previous operation of the elaborator client.

29. The processor system of claim 15 wherein at least one of the at least two processors is augmented with re-configurable logic execution pipelines dispatched by action of instruction mapped to a fixed address from the instruction stream of the at least two processors.

30. The parallel processor system of claim 29 wherein the client operates between at least two communicating operating system processes so as to provide additional addressable memory, software protection and to emulated a target software execution environment.

31. The parallel processor system of claim 29 wherein the plurality of clients incrementally change source code through incremental and coherent changes in the database to achieve incrementally altered and repartitioned simulation/execution between processors and re-configurable logic devices, the changes in source code preserve simulation/execution state in order to meet evolving requirements for interrupting simulation/execution.

32. The parallel processor system of claim 31 wherein the interrupting of simulation/execution may include actions selected from the group of triggering callbacks, callbacks, substituting event-driven/cycle-driven/continuous-domain algorithms or generate intermediate simulation/execution state required for more detailed debug, display or profiling.

33. The parallel processor system of claim 29 wherein relation information contained on the database relating information resident on a node and information only present on a remote node is represented by a remote proxy record, wherein the remote proxy record may provide for coherent caching of the information on the remote node using memory availability and coherence to limit cached copy lifetime.

34. A parallel processor system of claim 29 wherein analysis, elaboration and runtime dependency relations between database information may trigger compilation, simulation or execution client activity on the same or other nodes such that the database couples the trigger and the related compilation, simulation or execution, independent of the location of information and clients on various nodes and components of the node.

35. A parallel processor system of claim 29 wherein the elaborator client operation can produce elaborated database objects prior to code generation and wherein database objects resulting from elaboration re-use database objects resulting from operation of the analyzer client or objects generated by previous operation of the elaborator client.

36. The processor system of claim 1 wherein at least one of the at least two processors is augmented with re-configurable logic execution pipelines dispatched by action of instructions mapped to a fixed address from the instruction stream of the at least two processors.

37. The parallel processor system of claim 36 wherein the client operates between at least two communicating operating system processors so as to provide additional addressable memory, software protection and to emulate a target software execution environment.

38. The parallel processor system of claim 36 wherein the plurality of clients incrementally change source code through incremental and coherent changes in the database to achieve incrementally altered and repartitioned simulation/execution between processors and re-configurable logic devices, the changes in source code preserve simulation/execution state in order to meet evolving requirements for interrupting simulation/execution.

39. The parallel processor system of claim 38 wherein the interrupting of simulation/execution may include actions selected from the group of triggering callbacks, callbacks, substituting event-driven/cycle-driven/continuous-domain algorithms or generate intermediate simulation/execution state required for more detailed debug, display or profiling.

40. The parallel processor system of claim 36 wherein relation information contained on the database relating information resident on a node and information only present on a remote node is represented by a remote proxy record, wherein the remote proxy record may provide for coherent caching of the information on the remote node using memory availability and coherence to limit cached copy lifetime.

41. A parallel processor system of claim 36 wherein analysis, elaboration and runtime dependency relations between database information may trigger compilation, simulation or execution client activity on the same or other nodes such that the database couples the trigger and the related compilation, simulation or execution, independent of the location of information and clients on various nodes and components of the node.

42. A parallel processor system of claim 36 wherein the elaborator client operation can produce elaborated database objects prior to code generation and wherein database objects resulting from elaboration re-use database resulting from operation of the analyzer client or objects generated by previous operation of the elaborator client.

43. The processor system of claim 1 wherein the at least two processors each support a configurable instruction set architecture and wherein at least one of the at least two processors is augmented with reconfigurable logic execution pipelines.

44. The processor system of claim 15 wherein the at least two processors each support a reconfigurable instruction set architecture and wherein at least one of the at least two processors is augmented with reconfigurable logic execution pipelines.

* * * * *

UNITED STATES PATENT AND TRADEMARK OFFICE
CERTIFICATE OF CORRECTION

PATENT NO. : 5,999,734
DATED : December 7, 1999
INVENTOR(S) : John Christopher Willis; Robert Neill Newshutz It is certified that error appears in the above-indentified patent and that said Letters Patent is hereby corrected as shown below:

Col. 5, line 29, delete the word "convert" and add -- converter --

Col. 13, line 56, delete the word "result" and add -- results --

Col. 14, line 24, after the word coherent add the word -- changes --

Signed and Sealed this

Twenty-seventh Day of June, 2000

Attest:

Attesting Officer

Q. TODD DICKINSON

Director of Patents and Trademarks